United States Patent
Shamul et al.

(10) Patent No.: US 12,530,790 B2
(45) Date of Patent: Jan. 20, 2026

(54) HARDWARE-EFFICIENT DISPARITY ESTIMATION USING THE DCT OF INTERLEAVED IMAGES

(71) Applicant: SAMSUNG ELECTRONICS CO., LTD., Suwon-si (KR)

(72) Inventors: Naomi Shamul, Suwon-si (KR); Tal Bernstein, Suwon-si (KR); Tamar Dreifuss, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 18/339,173

(22) Filed: Jun. 21, 2023

(65) Prior Publication Data

US 2024/0428435 A1    Dec. 26, 2024

(51) Int. Cl.
*G06T 7/55* (2017.01)
*G06T 3/4015* (2024.01)
*G06V 10/764* (2022.01)

(52) U.S. Cl.
CPC .............. *G06T 7/55* (2017.01); *G06T 3/4015* (2013.01); *G06T 2207/20021* (2013.01)

(58) Field of Classification Search
CPC .................... G06T 7/55; G06T 3/4015; G06T 2207/20021; G06T 7/593; G06T 2207/10028; G06T 2207/20052; G06V 10/762; G06V 10/764
See application file for complete search history.

(56) References Cited

U.S. PATENT DOCUMENTS

| 5,235,434 | A * | 8/1993 | Wober .................. H04N 19/86 358/448 |
| 8,401,280 | B2 | 3/2013 | Um et al. |
| 8,488,870 | B2 | 7/2013 | Martinez-Bauza et al. |
| 9,172,939 | B2 | 10/2015 | Corral-Soto |
| 9,485,496 | B2 | 11/2016 | Atanassov et al. |

(Continued)

FOREIGN PATENT DOCUMENTS

| KR | 10-2063943 | 12/2019 |
| WO | WO 2019-070299 A1 | 4/2019 |

OTHER PUBLICATIONS

Christos Ttofis, et al., "A Hardware-Efficient Architecture for Accurate Real-Time Disparity Map Estimation," ACM Transactions on Embedded Computing Systems Volume 14 Issue 2 Article No. 36 pp. 1-26, Feb. 2015.

(Continued)

*Primary Examiner* — Jennifer Mehmood
*Assistant Examiner* — Dustin Bilodeau
(74) *Attorney, Agent, or Firm* — Morgan, Lewis & Bockius LLP

(57) ABSTRACT

A method for disparity estimation between digital images includes generating an interleaved image from two or more digital images with an offset between them, where the interleaved image is subdivided into a plurality of patches, computing discrete cosine transform (DCT) coefficients of each of the plurality of patches, computing, for each of the plurality of patches, a mean DCT descriptor from the DCT coefficients of each patch, and determining a disparity map from the mean DCT descriptor of each of the plurality of patches using a classifier. The disparity map is configured for real-time depth estimation from the two or more digital images.

20 Claims, 9 Drawing Sheets

(56) References Cited

U.S. PATENT DOCUMENTS

| | | | |
|---|---|---|---|
| 11,348,271 B2 | 5/2022 | Matsumoto | |
| 2011/0188740 A1* | 8/2011 | Lim | H04N 19/597 382/154 |
| 2014/0043444 A1 | 2/2014 | Haraguchi et al. | |
| 2018/0338143 A1* | 11/2018 | Fracastoro | H04N 19/18 |
| 2019/0197713 A1* | 6/2019 | Babon | G06T 7/593 |

OTHER PUBLICATIONS

Abdulkadir Akin, et al., "A hardware-oriented dynamically adaptive disparity estimation algorithm and its real-time hardware," GLSVLSI '13: Proceedings of the 23rd ACM international conference on Great lakes symposium on VLSIMay 2013pp. 165-160.

Carla L. Pagliari et al., "Stereo disparity computation in the DCT domain using enetic algorithms," Proceedings of International Conference on Image Processing, Oct. 26-29, 1997.

Nikolaus Mayer, et al., "A Large Dataset to Train Convolutional Networks for Disparity, Optical Flow, and Scene Flow Estimation," Proceedings of the IEEE Conference on Computer Vision and Pattern Recognition (CVPR). 2015. pp. 4040-4048.

C.L. Pagliari, et al., "Disparity estimation using edge-oriented classification in the DCT domain," Electronics Letters 71th, vol. 34, Issue 12, Jun. 11, 1998, p. 1214-1216.

Abhijith Punnappurath, et al., "Modeling Defocus-Disparity in Dual Pixel Sensors," 2020 IEEE International Conference on Computational Photography (ICCP), Date of Conference: Apr. 24-26, 2020.

Christos Ttofis,, et al., "Edge-Directed Hardware Architecture for Real-Time Disparity Map Computation," IEEE Transactions on Computers ( vol. 62, Issue; 4, Apr. 2013).

Qiang Wang, et al., "FADNet: A Fast and Accurate Network for Disparity Estimation," 2020 IEEE International Conference on Robotics and Automation (ICRA) Date of Conference: May 31, 2020-Aug. 31, 2020.

* cited by examiner

HARDWARE-EFFICIENT DISPARITY ESTIMATION USING THE DCT OF INTERLEAVED IMAGES

TECHNICAL FIELD

The present invention is in the technical field of computer vision and image processing. More particularly, the present invention deals with the estimation of the disparity between two or more images with offsets between them.

DISCUSSION OF THE RELATED ART

A disparity map can be used for real-time depth estimation from a pair of digital images acquired with a multi-lens sensor system. This is a central task in the field of robotics and in different automotive applications, among others. It is also beneficial for image sensors where multiple pixels are covered by a single, shared micro-lens (μlens). Each pixel in an imaging sensor uses a micro-lens to collect light from a larger area and focus it onto the small photo-sensitive area of the sensor. In traditional sensors, each pixel has its own individual micro-lens. In many newer sensors, multiple pixels share a single micro-lens. When an image is in focus, this change does not affect the image. The pixels under the micro-lens capture light from areas in the scene with an offset between them. When the image is out of focus, however, the shared μlens produces an offset between the pixels it covers, similar to the offset between images acquired with a stereo camera system. The offset in this case depends on the distance of the scene from the focal plane: the greater the distance, the less in focus the scene is and the larger the offset.

The offset has a direction that depends on the structure of the sensor. In a 2PD sensor with only two pixels sharing a micro-lens, there is only horizontal disparity, and the vertical coordinates do not shift. In a $Tetra^2$ QCell sensors, there is symmetric vertical and horizontal offset towards the center of the micro-lens or away from it. In this case, the offset along both axes is equal and thus the disparity map encodes both offsets.

FIG. 1 illustrates a disparity effect in a $Tetra^2$ QCell sensor, in which each 4 pixels share a single μlens.

In sensors in which multiple pixels are covered by the same micro-lens, each pixel under a single micro-lens has a different phase. For example, 2PD sensors, where each micro-lens covers two pixels, have two phases: left and right. Images acquired with such sensors can be divided into sub-images called phase images, where each sub-image contains only the pixels from a single phase. For example, taking all of the left phase pixels from a 2PD image produces the left phase image. In $Tetra^2$ sensors, each micro-lens covers 4 pixels in a 2×2 square pattern. These offsets, depicted on the right side of the image, include, clockwise from the upper right corner, the top-right phase, the bottom-right phase, the bottom-left phase, and the top-left phase. For example, the top-right phase refers to the top-right pixel under the micro-lens.

Effectively, such OOF images are an interleaving of several phase images with offsets between them. These offsets generate severe imaging artifacts that must be corrected to achieve acceptable image quality, for example by blurring. To preserve the details in in-focus images, those areas that contain disparity and those that do not are detected. This detection should be performed in real time, requiring a hardware-efficient disparity estimation method.

FIG. 2 illustrates an out-of-focus image acquired with a Tetra QCell sensor that includes four interleaved images with offsets between them.

Existing disparity estimation methods can be divided into local methods, which compute the disparity of each pixel separately using its local support, and global methods, which compute the entire disparity map at once. Local methods generally find matching pixel pairs in the two images and compute the disparity based on the distance between them. Global approaches include deep neural networks that use supervised learning to produce a full disparity map, and iterative optimization methods that maximize the smoothness of the disparity map and its consistency with the input images. Existing approaches are computationally complex and use prohibitively large supports. To achieve satisfactory results, they must be implemented in software. In addition, existing methods assume that the inputs are either full RGB images or monochromatic. Adapting these methods to receive inputs with a Bayer color pattern will make them even more computationally complex.

SUMMARY

A method according to an embodiment generates a disparity map that indicates the size of the offset at each image location in a hardware-efficient way. A method according to an embodiment estimates the disparity using a comparatively small number of simple calculations, and uses only a small, local support around the pixel for which the disparity is being estimated.

According to an embodiment of the disclosure, there is provided a method for disparity estimation between digital images that includes generating an interleaved image from two or more digital images with an offset between them, wherein the interleaved image is subdivided into a plurality of patches, computing discrete cosine transform (DCT) coefficients of each of the plurality of patches, computing, for each of the plurality of patches, a mean DCT descriptor from the DCT coefficients of each patch, and determining a disparity map from the mean DCT descriptor of each of the plurality of patches using a classifier. The disparity map is configured for real-time depth estimation from the two or more digital images.

According to a further embodiment of the disclosure, the interleaved image includes a plurality of pixels arranged in a 2-dimensional array of size m×m, and each patch of the plurality of patches is a 2-dimensional array of pixels of size n×n, where n<m.

According to a further embodiment of the disclosure, wherein the discrete cosine transform (DCT) coefficients of an n×n patch of the interleaved image form a descriptor that is an n-n array of coefficients. Computing a mean DCT descriptor from the DCT coefficients of each patch comprises computing an average of each coefficient with a corresponding coefficient in an orthogonal direction, and replacing the coefficient and the corresponding coefficient in the descriptor with the average, converting the descriptor to a 1-dimensional (1D) array of length $n^2$, and removing redundant values that result from symmetries of the DCT, where a 1D descriptor of length $[n \times (n+1)/2]-1$ is obtained.

According to a further embodiment of the disclosure, the method includes, for each patch: computing DCT coefficients for each sub-patch in a neighborhood of a current patch, where the neighborhood is a set of non-overlapping nearest-neighbor patches of the current patch.

According to a further embodiment of the disclosure, the method includes averaging each DCT coefficient of each sub-patch of the current patch over all sub-patches of the current patch.

According to a further embodiment of the disclosure, for an image with a Bayer pattern, the sub-patches are single color sub-patches that correspond to a color filter array (CFA) pattern.

According to a further embodiment of the disclosure, DCT coefficients of an image patch have high or values that depend on the level of disparity in the image patch.

According to a further embodiment of the disclosure, the method includes reducing a training set size of the classifier using clustering.

According to another embodiment of the disclosure, there is provided a method for disparity estimation between digital images that includes generating an interleaved image from two or more digital images with an offset between them, wherein the interleaved image is subdivided into a plurality of patches, computing discrete cosine transform (DCT) coefficients of each of the plurality of patches wherein the discrete cosine transform (DCT) coefficients of an n×n patch of the interleaved image form a descriptor that is an n×n array of coefficients, computing an average of each coefficient with a corresponding coefficient in an orthogonal direction, and replacing the coefficient and the corresponding coefficient in the descriptor with the average, converting the descriptor to a 1-dimensional (1D) array of length $n^2$, and removing redundant values that result from symmetries of the DCT, where a 1D descriptor of length $[n\times(n+1)/2]-1$ is obtained.

According to a further embodiment of the disclosure, the method includes determining a disparity map from the mean DCT descriptor of each of the plurality of patches using a classifier, where the disparity map is configured for real-time depth estimation from the two or more digital images.

According to a further embodiment of the disclosure, the interleaved image includes a plurality of pixels arranged in a 2-dimensional array of size m×m, and each patch of the plurality of patches is a 2-dimensional array of pixels of size n×n, where n<m.

According to a further embodiment of the disclosure, the method includes, for each patch: computing DCT coefficients for each sub-patch in a neighborhood of a current patch, where the neighborhood is a set of non-overlapping nearest-neighbor patches of the current patch, and averaging each DCT coefficient of each sub-patch of the current patch over all sub-patches of the current patch.

According to another embodiment of the disclosure, there is provided a non-transitory program storage device readable by a computer, tangibly embodying a program of instructions executed by the computer to perform a method for disparity estimation between digital images.

DETAILED DESCRIPTION

Basic Assumptions

A disparity estimation method according to an embodiment is applicable to a pair of images or to a set of images, under the assumption that the size of the offset between each pair of images is the same. The direction of the offset may, however, be different for each pair of images. The offset may also vary in different image locations, as long as the variation is consistent in all image pairs.

An estimation method according to an embodiment does not assume that the input images are RGB images, or that they are monochromatic, and is applicable to raw images with different color channel patterns.

Introduction

Methods according to embodiments of the disclosure estimate the disparity between each pair of points in a set of digital images using an interleaved image generated by merging the set of digital images together. The interleaved image is another digital image that includes a plurality of pixels arranged in a 2-dimensional array. The interleaving of the digital images creates typical patterns that correlate to different amounts of disparity. Methods according to embodiments use the discrete cosine transform (DCT) of small patches of the interleaved image as a descriptor of these patterns, and represent the support of the patch for which the disparity is being estimated with the average DCT coefficients of neighboring patches around the current patch. For an m×m interleaved image, each patch is of size n×n, where n and m are positive integers and n<m. In an embodiment, the neighboring patches around the current patch are nearest neighbor patches of the current patch. The mean DCT descriptor can be used with different classification schemes to estimate the amount of disparity between the original images.

Disparity Patterns in the Interleaved Image

When interleaving two images with a horizontal shift between them, the columns of the images are interleaved. The first column is taken from the first image, the second from the second image, the third from the first image, and so on. When interleaving four images with symmetric horizontal and vertical shifts between them, they are interleaved pixel by pixel. Each 2×2 pixel square in the interleaved image will contain one pixel from each original image: the top-left pixel will be taken from the first image, the top-right pixel will be taken from the second image, and so on. Different applications may use image sets with other types of offsets between them and in those cases different interleaving approaches may be better suited.

Figure 1:
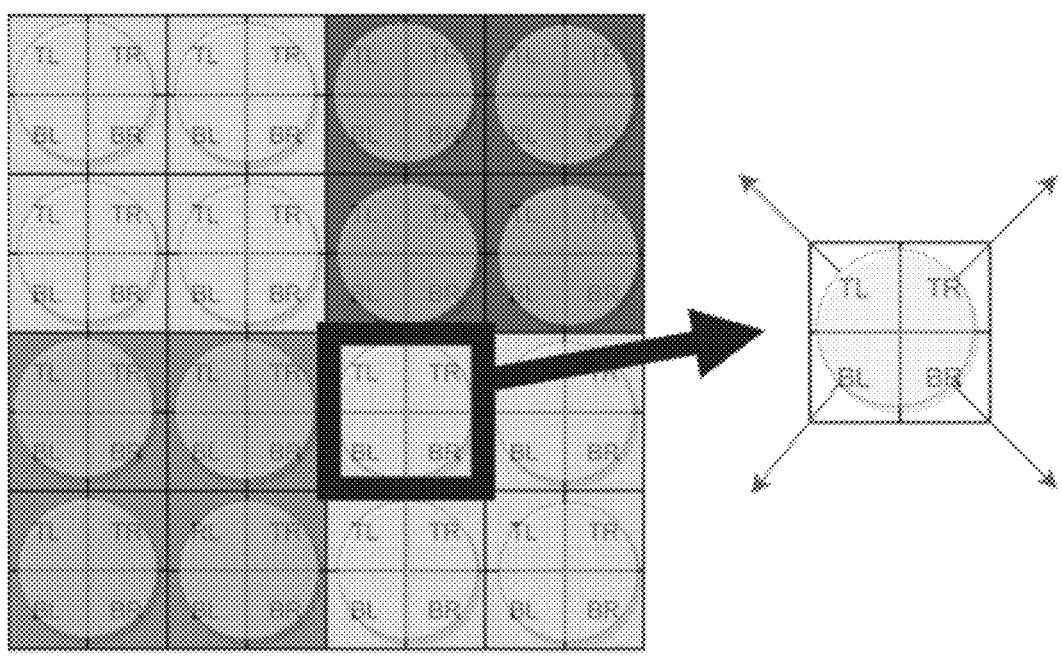
FIG. 1 illustrates a disparity effect in a Tetra[2] QCell sensor, in which each 4 pixels share a single μlens, according to an embodiment.
Figure 2:
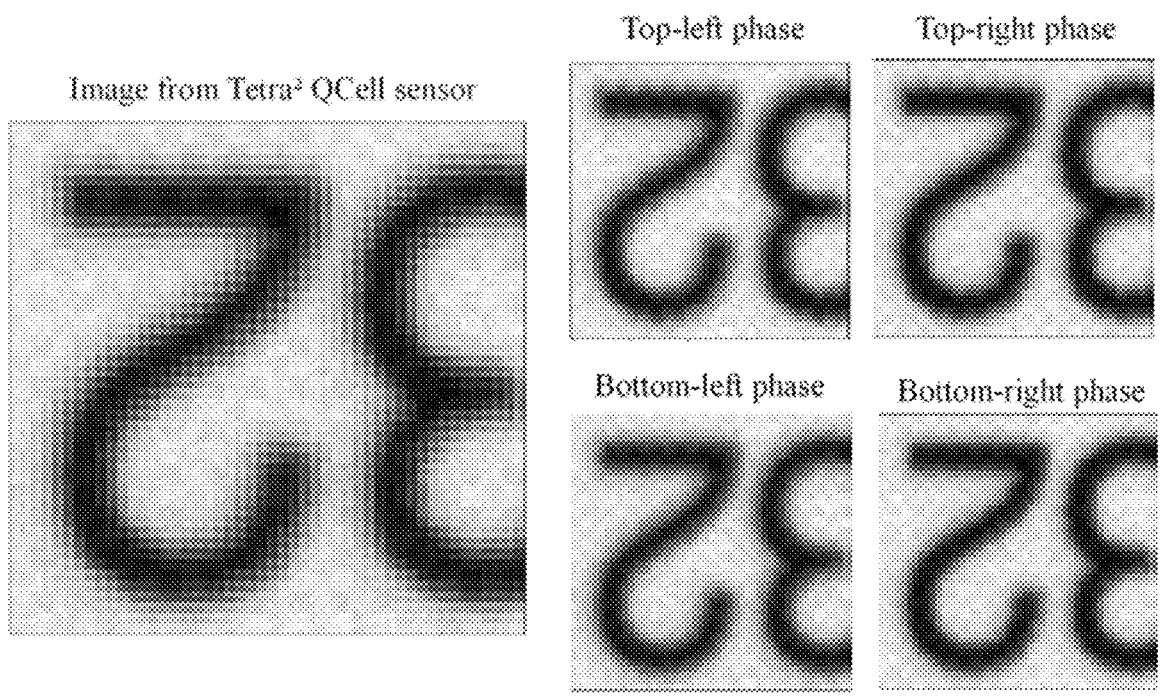
FIG. 2 illustrates an out-of-focus image acquired with a Tetra[2] QCell sensor that includes four interleaved images with offsets between them, according to an embodiment.
Figure 3:
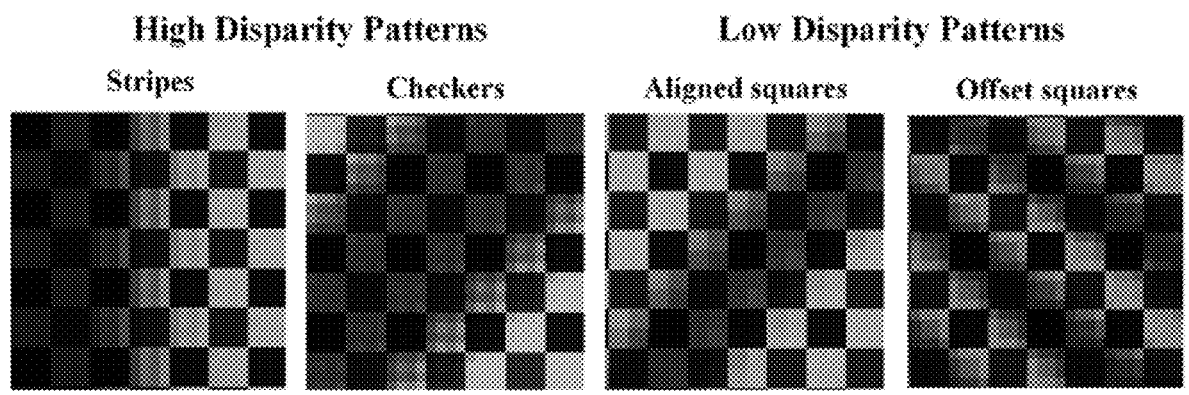
FIG. 3 illustrates typical disparity patterns in Tetra[2] QCell sensor images, according to an embodiment.

The interleaving of images with offsets between them generates distinctive patterns in the interleaved image. These patterns vary depending on the size of the offset between the images. For example, interleaving a pair of images with a large offset between them will create a stripe pattern, while interleaving a pair of images with no offset between them will create a pattern resembling binning, where each pair of adjacent pixels have the same value. FIG. 3 shows examples of the typical disparity patterns generated by the interleaving of four images in QCell image sensors with a Tetra$^2$ (4×4) color filter array (CFA), where four images with offsets between them are interleaved. High disparity patterns are depicted on the left side of FIG. 3, which include stripes on the far left, and checkers on the center left, and low disparity patterns are depicted on the right side of FIG. 3, which include offset squares on the far right, and aligned squares on the center right.

The patterns generated by the interleaving are generally not found in natural images, and are highly correlated with the amount of disparity between the original images. Identifying the type of pattern present in the interleaved images allows estimation of the amount of disparity.

These patterns are evident even in very small image patches. FIG. 3 shows that the patterns can be clearly identified in 4×4 pixel image patches. Estimating disparity based on these patterns thus requires only a very small support.

Discrete Cosine Transform of Interleaved Images

Figure 4:
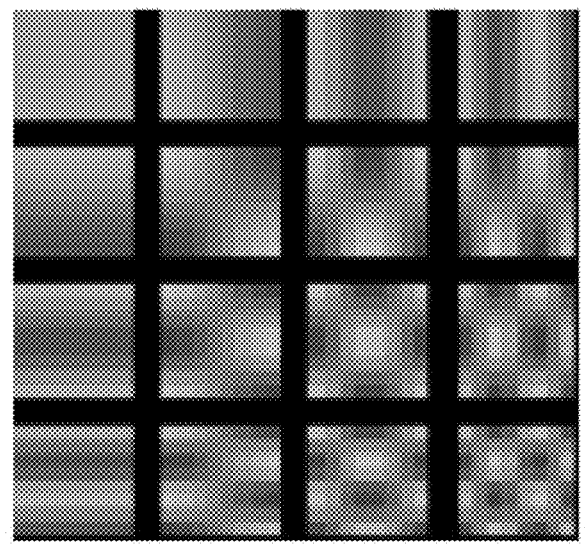
FIG. 4 shows the 16 basis functions of a 4×4 discrete cosine transform (DCT), according to an embodiment.

The discrete cosine transform (DCT) represents an image as a sum of sinusoids of varying magnitudes and frequencies. These sinusoids are called the basis functions of the DCT. The DCT coefficients can be regarded as the weights applied to each basis function. FIG. 4 illustrates the 16 basis functions for 4×4 image patches.

Figure 5:
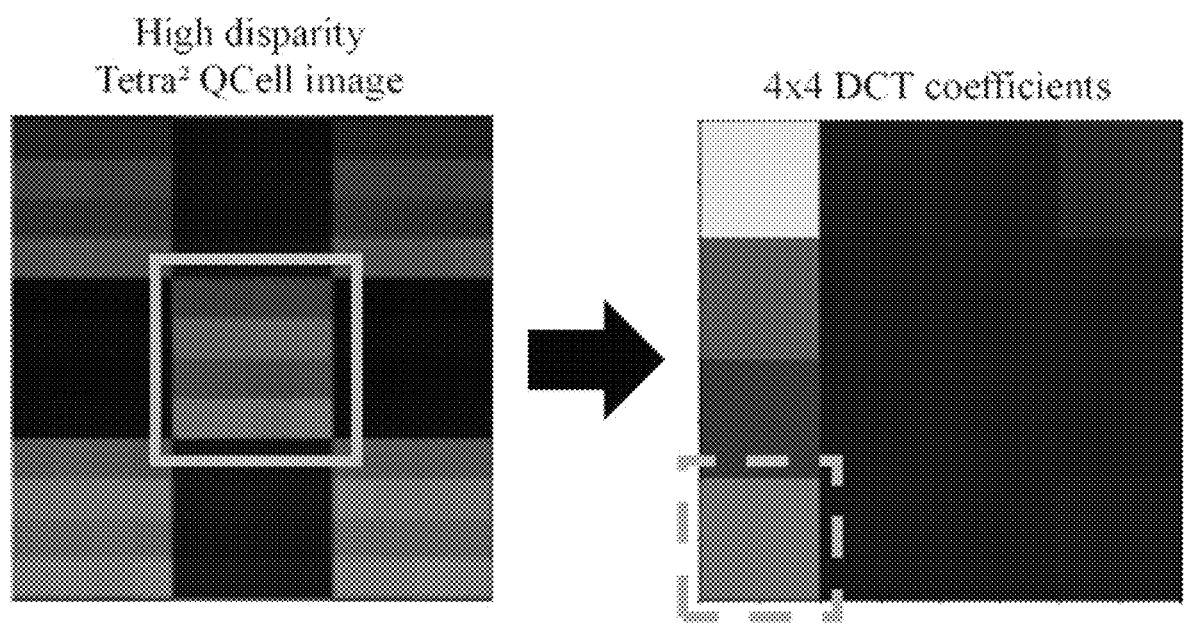
FIG. 5 illustrates DCT coefficients of interleaved images, according to an embodiment.

Several of the DCT basis functions resemble the typical disparity patterns observed in the interleaving of images with disparity between them. It is expected that in interleaved images with these patterns, the coefficients of the corresponding basis functions will have higher values. FIG. 5 shows an example of DCT coefficients of an interleaved image that demonstrate this. The left image illustrates the interleaving of four images with a large offset between them produced by a Tetra$^2$ QCell image sensor, showing a characteristic stripe pattern. The right image illustrates the DCT coefficients of the center 4×4 patch on the left side, where dark grey values are low, light grey values are high, with a high value for the high frequency horizontal basis function, outlined in the lower left. A low coefficient value indicates that the frequency corresponding to that coefficient is not very strong in the image. The dark grey on the right portion of the right image therefore indicates that in the image example, shown on the left of the figure, there are no strong vertical frequencies. The frequencies corresponding to each coefficient can be seen in FIG. 4.

Each 4×4 image patch in the dataset was given a label of 'no disparity', 'high disparity', 'aligned squares', or 'offset squares', based on the disparity pattern present in the patch. FIG. 3 shows examples of these patterns. An analysis of the distribution of DCT coefficient values for different disparity patterns shows that indeed the coefficient values are highly discriminative between the different patterns. Computing the DCT coefficients for a set of labeled 4×4 interleaved image patches with different amounts of disparity shows, for example, that the vertical and horizontal high frequency basis functions receive high values for patches with high disparity, medium values for patches with low disparity and low values for patches with no disparity.

Figure 6:
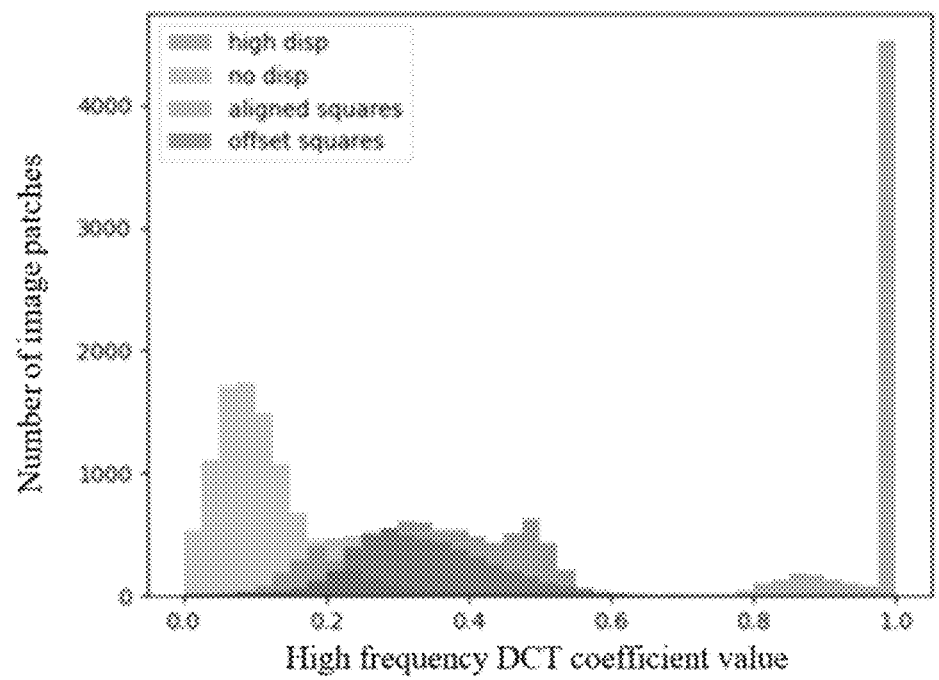
FIG. 6 illustrates the distribution of the DCT coefficients of high frequency basis functions for 4×4 interleaved image patches from a Tetra[2] QCell sensor with different amounts of disparity, according to an embodiment.

FIG. 6 is a histogram showing how many image patches had each DCT coefficient value for vertical or horizontal high frequencies. The histogram in FIG. 6 is a visualization of the distribution of DCT coefficients described in the previous paragraph. The horizontal axis represents (normalized) DCT coefficient values and the vertical axis shows the number of image patches that had each value. FIG. 6 illustrates the distribution of the DCT coefficients of high frequency horizontal and vertical basis functions for 4×4 interleaved image patches from a Tetra$^2$ QCell sensor with different amounts of disparity, according to an embodiment. Referring to FIG. 6, high disparity coefficients are clustered on the right side of the distribution, low or no disparity coefficients are clustered on the left side of the distribution, while aligned squares and offset squares overlap each other in the middle part of the distribution.

A method according to an embodiment uses this property to estimate disparity using the DCT coefficients of small patches of the interleaved image. The DCT can be computed by applying constant filters to each image patch and can be implemented efficiently in hardware (HW).

Mean DCT Coefficients

Figure 7:
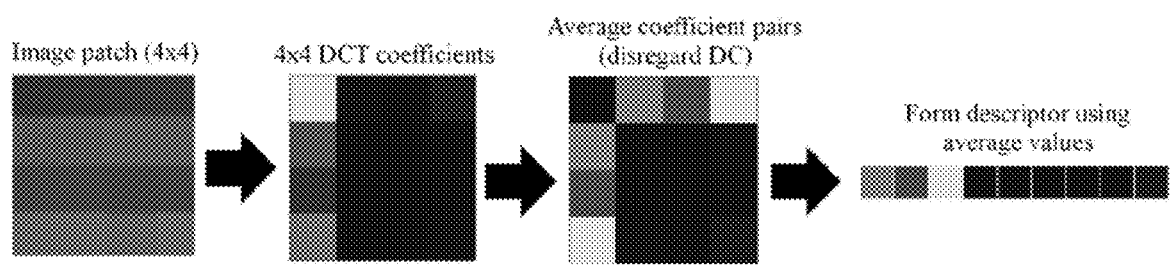
FIG. 7 illustrates reducing the number of DCT coefficients in the descriptor of a 4×4 interleaved image patch by averaging corresponding coefficient values, according to an embodiment.

A DCT is computed for each 2D image patch of size n×n to obtain a 2D DCT array of size n×nt. This array can serve as a descriptor for the image patch. In general, this 2D array is converted into a 1D array of length $n^2$ by flattening. The DCT represents an image using a number of coefficients equal to the number of pixels in the image. However, note that the direction of the DCT basis function (horizontal/vertical) does not contribute information about the type of disparity present, and depends solely on the original image content. This insight is used to reduce the size of the DCT descriptor and increase HW efficiency. Averaging can be used to reduce the size of this descriptor so that it contains fewer values but still serves as an informative descriptor for the interleaved image patch. Instead of using all of the DCT coefficients, the average of each coefficient with the corresponding coefficient in the orthogonal direction is computed. The average values are included in the descriptor instead of the two original coefficient values. This reduces the number of values in the DCT descriptor by a factor of nearly two. FIG. 7 illustrates this procedure for 4×4 image patches. Averaging the DCT descriptor of several image patches produces a descriptor for a larger area of the image using the same number of values.

FIG. 7 illustrates reducing the number of DCT coefficients in the descriptor of a 4×4 interleaved image patch by averaging corresponding coefficient values, according to an embodiment. FIG. 7 shows, from left to right, the 4×4 image patch, the 4×4 DCT coefficients, the average coefficient pairs (disregarding DC), and the final descriptor that uses the average values.

The averaging of the DCT coefficients is performed as follows. The DC component is the top-left DCT coefficient and does not provide information regarding the frequencies in the image. It is therefore not useful for disparity estimation, and is disregarded when generating the DCT descriptor of the image patch. After disregarding the DC, the values of the horizontal and vertical frequency pairs are averaged together, since only the frequencies in the image are relevant, not their directions. This produces a symmetric 2D array of average coefficients. The 2D array is flattened and the redundancies caused by the symmetry are removed. Thus, an initial n×n 2D DCT array is transformed into a 1D array of length [n×(n+1)/2]−1.

To increase the robustness of the disparity estimation procedure, the neighborhood around the current image patch can also be used. However, computing the DCT of a larger image increases the number of values in the descriptor, and in turn increases the number of operations to estimate the disparity. Instead, according to an embodiment, larger image patches are described using the mean DCT coefficients of multiple sub-patches.

Figure 8:
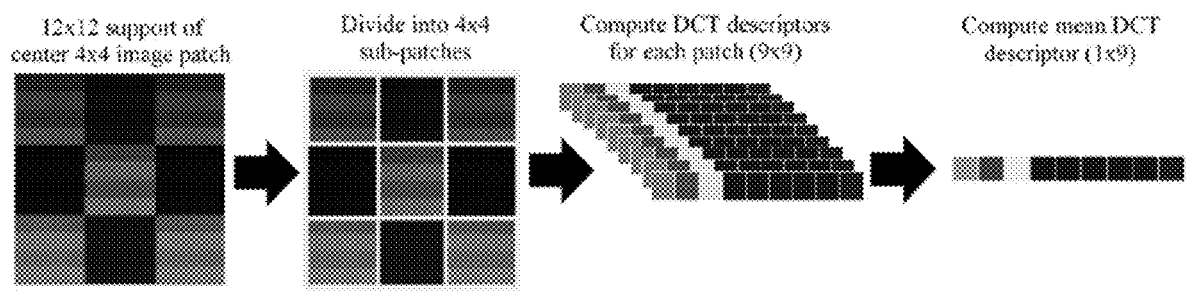
FIG. 8 illustrates computing the mean DCT descriptors of sub-patches to describe larger image patches without increasing the size of the descriptor, according to an embodiment.

According to an embodiment, the current patch's neighborhood is divided into non-overlapping sub-patches of the same size. In raw images with a Bayer pattern, a natural choice would be to divide the image patch into single-color sub-patches corresponding to the color filter array (CFA) pattern. The DCT coefficients of each sub-patch are computed separately, and then the average value of each coefficient is computed over all of the sub-patches. A single set of coefficients that describe the entire support is obtained. This descriptor has many fewer values than the number of pixels in the support. FIG. 8 illustrates this procedure for a 12×12 support around a 4×4 image patch of a Tetra$^2$ Qcell image.

FIG. 8 illustrates computing the mean DCT descriptors of sub-patches to describe larger image patches without increasing the size of the descriptor, according to an embodiment. FIG. 8 shows, from left to right, the 12×12 support of the center 4×4 image patch, the division into 4×4 sub-patches, the computing of the DCT descriptors for each 9×9 patch, and computing of the 1×9 mean DCT descriptor.

Disparity Determination with Mean DCT Descriptor

Various classification schemes can be used to estimate the disparity in an interleaved image patch given a DCT descriptor of the patch and its support. For example, supervised learning can be used to train a classifier to distinguish between different disparity patterns. Similarly, a nearest neighbor approach can be employed, or a maximum likelihood estimator can be implemented based on the distributions of the coefficient values.

The chosen method may need to be adapted to allow for a HW-efficient implementation. For example, even classic supervised learning methods such as support vector machines (SVM) may produce models too large to implement in HW, depending on the size of the training set used. To ensure that the learned model is sufficiently small, the training set size according to an embodiment can be reduced using clustering without harming the performance.

OVERVIEW

Embodiments of the disclosure provide a method for disparity estimation using the interleaving of the input images. Interleaved images have characteristic patterns that reflect the amount of disparity between the original images. These patterns are described using a mean DCT descriptor, and the disparity is estimated using a classification method of choice.

Figure 9:
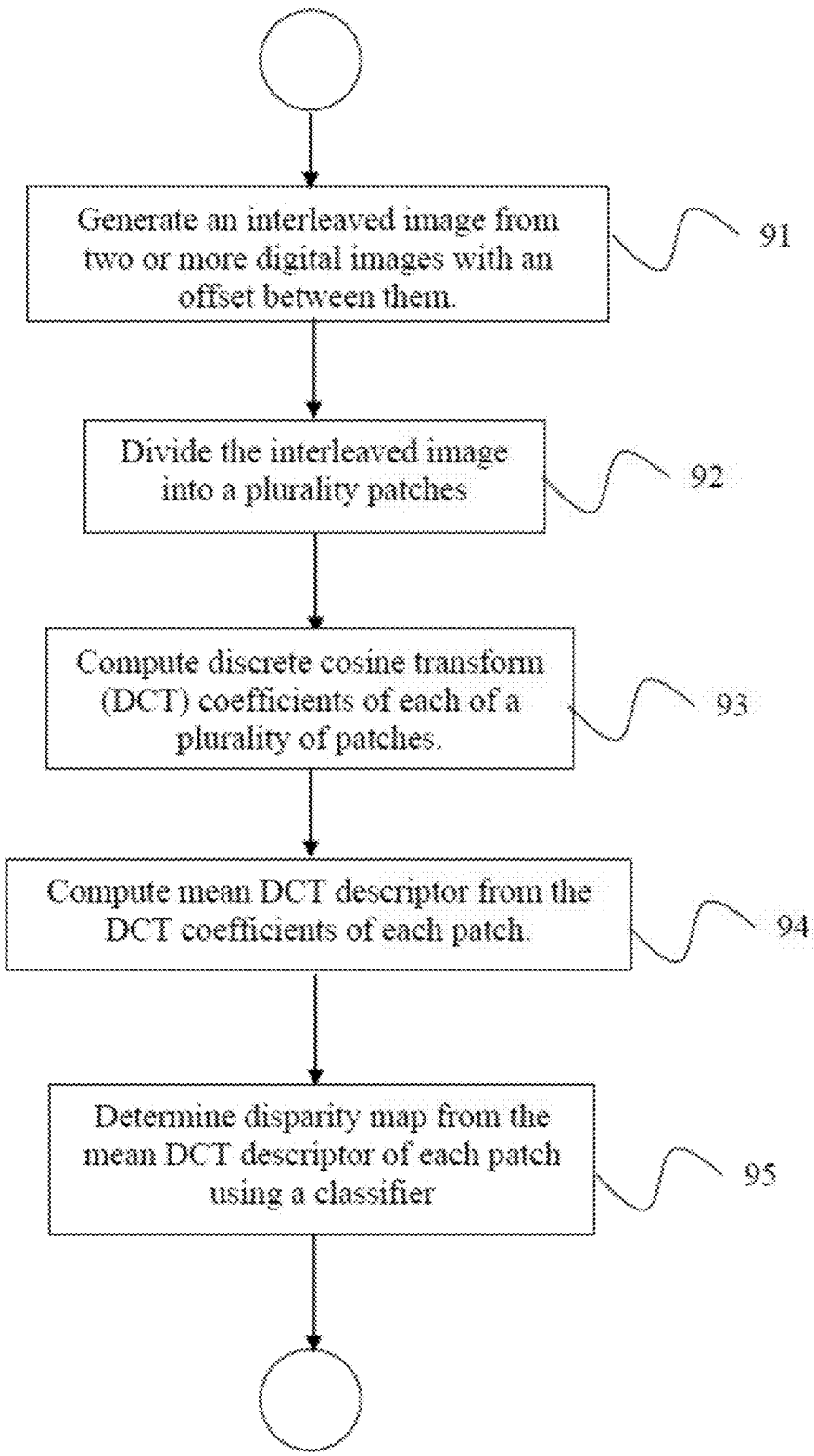
FIG. 9 is a flow diagram of a disparity estimation method, according to an embodiment.

FIG. 9 summarizes the steps of the invention. Given two or more images with offsets between them as inputs, a method according to an embodiment begins at step 91 by generating an interleaved image from two or more digital images, and subdividing the interleaved image into a plurality of patches at step 92. For a 2-dimensional interleaved image of size m×m pixels, each patch of the plurality of patches is of size n×n pixels, where n<m. At step 93, discrete cosine transform (DCT) coefficients are computed for each of the plurality of patches. The discrete cosine transform (DCT) coefficients of an n×n patch of the interleaved image form a descriptor that is an n×n array of coefficients.

At step 94, a mean DCT descriptor is computed for each of the plurality of patches from the DCT coefficients of each patch. Computing a mean DCT descriptor includes computing an average of each coefficient with a corresponding coefficient in an orthogonal direction, replacing the coefficient and the corresponding coefficient in the descriptor with the average, converting the descriptor to a 1-dimensional (1D) array of length $n^2$; and removing redundant values that result from symmetries of the DCT, to obtain a 1D descriptor of length [n×(n+1)/2]−1. Computing a mean DCT descriptor further includes computing DCT coefficients for each sub-patch in a neighborhood of a current patch, where the neighborhood is a set of non-overlapping nearest-neighbor patches of the current patch, and averaging each DCT coefficient of each sub-patch of the current patch over all sub-patches of the current patch.

At step 95, the disparity map is determined from the mean DCT descriptor of each of the plurality of patches using a classifier. The disparity map is output, and can be used for real-time depth estimation and removing artifacts from OOF images.

EFFECTS

The use of the mean DCT descriptor of the interleaved input images allows methods according to embodiments to estimate disparity using a small number of simple operations, and only a small support around each pixel for which the disparity is being estimated. Methods according to embodiments are thus well suited for implementation in HW. Methods according to embodiments do not assume the inputs are either full RGB images or monochromatic and can be used with inputs of different formats. Methods according to embodiments can be applied to the disparity estimation in image sensors with shared μlenses, which suffer from artifacts in OOF areas due to the disparity between the phase images. Methods according to embodiments can be used to improve the image quality of these sensors, allowing for better detail preservation in in-focus areas and fewer artifacts in OOF areas.

Invention Example

Figure 10:
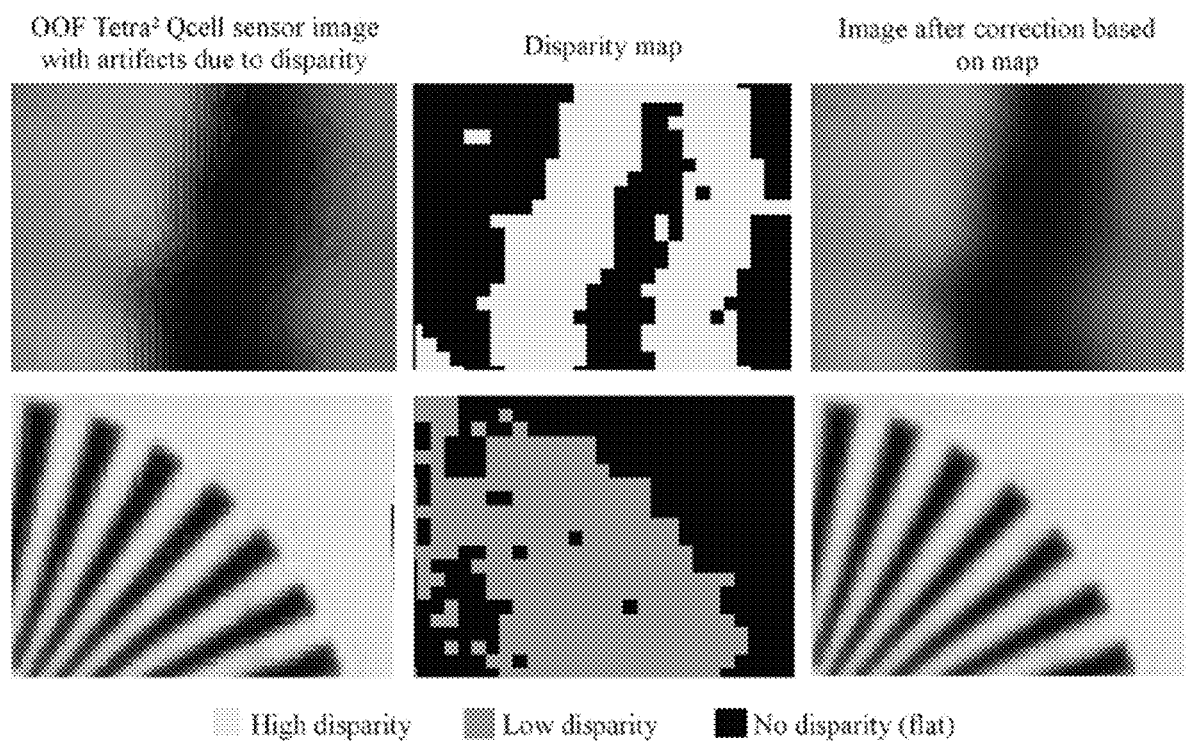
FIG. 10 illustrates examples of applying a method according to an embodiment to estimate the disparity between the four phase images of a Tetra[2] QCell images.

FIG. 10 illustrates examples of applying a method according to an embodiment to estimate the disparity between the four phase images of a Tetra$^2$ QCell images. The images on the left side are examples of OOF images acquired from a Tetra$^2$ Qcell sensor, and exhibit artifacts due to disparity. The images in the center show disparity maps generated from the images to the left, where black indicates a region with no disparity, grey indicates a region with low disparity, and white indicates a region with high disparity. The images on the right are generated by correcting the images on the left based on their respective disparity maps in the center. The disparity is estimated from the interleaving of the four QCell phase images using the mean DCT descriptor described in the previous section and an SVM classifier which determines the amount of disparity.

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

Figure 11:
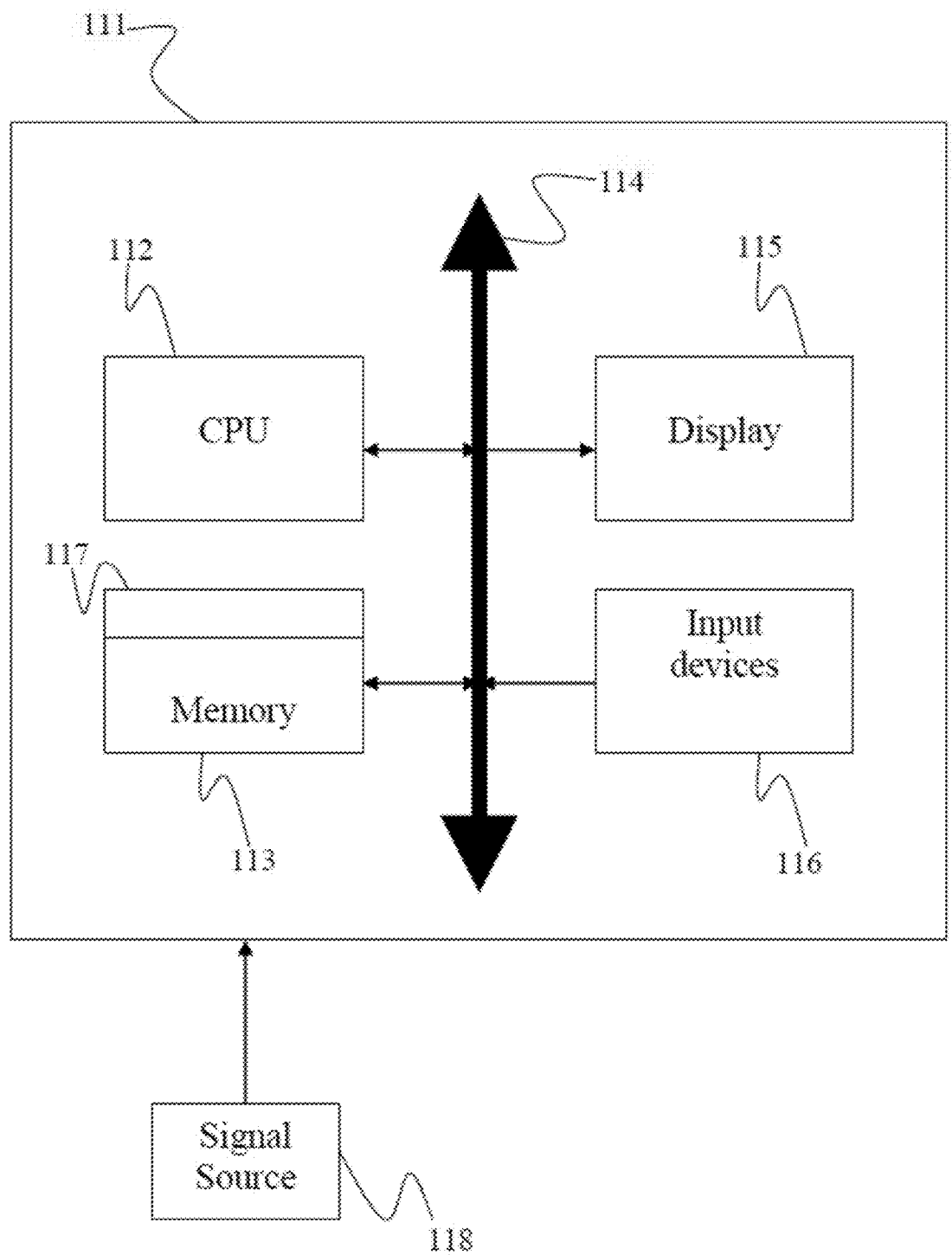
FIG. 11 is a block diagram of a system for estimating the disparity between two or more images with offsets between them, according to an embodiment of the disclosure.

FIG. 11 is a block diagram of a system for estimating the disparity between two or more images with offsets between them, according to an embodiment of the disclosure. Referring now to FIG. 11, a computer system 111 for implementing the present disclosure can comprise, inter alia, a central processing unit (CPU) or controller 112, a memory 113 and an input/output (I/O) interface 114. The computer system 111 is generally coupled through the I/O interface 114 to a display 115 and various input devices 116 such as a mouse and a keyboard. The support circuits can include circuits such as cache, power supplies, clock circuits, and a communication bus. The memory 113 can include random access memory (RAM), read only memory (ROM), disk drive, tape drive, etc., or a combinations thereof. The present disclosure can be implemented as a routine 117 that is stored in memory 113 and executed by the CPU or controller 112 to process the signal from the signal source 118. As such, the computer system 111 is a general purpose computer system that becomes a specific purpose computer system when executing the routine 117 of the present disclosure. Alternatively, as described above, embodiments of the present disclosure can be implemented as an ASIC or FPGA 117 that is in signal communication with the CPU or controller 112 to process the signal from the signal source 118.

The computer system 111 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for disparity estimation between digital images, comprising:
generating an interleaved image from two or more digital images with an offset between them, wherein the interleaved image is subdivided into a plurality of patches;
computing discrete cosine transform (DCT) coefficients of each of the plurality of patches;
computing, for each of the plurality of patches, a mean DCT descriptor from the DCT coefficients of each patch; and
determining a disparity map from the mean DCT descriptor of each of the plurality of patches using a classifier, wherein the disparity map is configured for real-time depth estimation from the two or more digital images.

2. The method of claim 1, wherein the interleaved image includes a plurality of pixels arranged in a 2-dimensional array of size m×m, and each patch of the plurality of patches is a 2-dimensional array of pixels of size n×n, where n<m.

3. The method of claim 1,
wherein the discrete cosine transform (DCT) coefficients of an n×n patch of the interleaved image form a descriptor that is an n×n array of coefficients,
wherein computing a mean DCT descriptor from the DCT coefficients of each patch comprises:
computing an average of each coefficient with a corresponding coefficient in an orthogonal direction, and replacing the coefficient and the corresponding coefficient in the descriptor with the average;
converting the descriptor to a 1-dimensional (ID) array of length $n^2$; and
removing redundant values that result from symmetries of the DCT,
wherein a ID descriptor of length $[n\times(n+1)/2]-1$ is obtained.

4. The method of claim 3, further comprising, for each patch:
computing DCT coefficients for each sub-patch in a neighborhood of a current patch, where the neighborhood is a set of non-overlapping nearest-neighbor patches of the current patch.

5. The method of claim 4, further comprising:
averaging each DCT coefficient of each sub-patch of the current patch over all sub-patches of the current patch.

6. The method of claim 4, wherein, for an image with a Bayer pattern, the sub-patches are single color sub-patches that correspond to a color filter array (CFA) pattern.

7. The method of claim 3, wherein DCT coefficients of an image patch have high or low values that depend on the level of disparity in the image patch.

8. The method of claim 1, further comprising reducing a training set size of the classifier using clustering.

9. A method for disparity estimation between digital images, comprising:
generating an interleaved image from two or more digital images with an offset between them, wherein the interleaved image is subdivided into a plurality of patches;
computing discrete cosine transform (DCT) coefficients of each of the plurality of patches wherein the discrete cosine transform (DCT) coefficients of an n×n patch of the interleaved image form a descriptor that is an nan array of coefficients;
computing an average of each coefficient with a corresponding coefficient in an orthogonal direction, and replacing the coefficient and the corresponding coefficient in the descriptor with the average;
converting the descriptor to a 1-dimensional (ID) array of length $n^2$; and
removing redundant values that result from symmetries of the DCT,
wherein a ID descriptor of length $[n\times(/1+1)/2]-1$ is obtained.

10. The method of claim 9, further comprising:
determining a disparity map from the mean DCT descriptor of each of the plurality of patches using a classifier, wherein the disparity map is configured for real-time depth estimation from the two or more digital images.

11. The method of claim 9, wherein the interleaved image includes a plurality of pixels arranged in a 2-dimensional array of size m×m, and each patch of the plurality of patches is a 2-dimensional array of pixels of size n×n, where n<m.

12. The method of claim 9, further comprising, for each patch:
   computing DCT coefficients for each sub-patch in a neighborhood of a current patch, where the neighborhood is a set of non-overlapping nearest-neighbor patches of the current patch; and
   averaging each DCT coefficient of each sub-patch of the current patch over all sub-patches of the current patch.

13. A non-transitory program storage device readable by a computer, tangibly embodying a program of instructions executed by the computer to perform a method for disparity estimation between digital images, the method comprising:
   generating an interleaved image from two or more digital images with an offset between them, wherein the interleaved image is subdivided into a plurality of patches;
   computing discrete cosine transform (DCT) coefficients of each of the plurality of patches;
   computing, for each of the plurality of patches, a mean DCT descriptor from the DCT coefficients of each patch; and
   determining a disparity map from the mean DCT descriptor of each of the plurality of patches using a classifier,
   wherein the disparity map is configured for real-time depth estimation from the two or more digital images.

14. The non-transitory computer readable program storage device of claim 13, wherein the interleaved image includes a plurality of pixels arranged in a 2-dimensional array of size m×m, and each patch of the plurality of patches is a 2-dimensional array of pixels of size n×n, where n<m.

15. The non-transitory computer readable program storage device of claim 13,
   wherein the discrete cosine transform (DCT) coefficients of an n×n patch of the interleaved image form a descriptor that is an n×n array of coefficients,
   wherein computing a mean DCT descriptor from the DCT coefficients of each patch comprises:
   computing an average of each coefficient with a corresponding coefficient in an orthogonal direction, and replacing the coefficient and the corresponding coefficient in the descriptor with the average;
   converting the descriptor to a 1-dimensional (ID) array of length $n^2$, and
   removing redundant values that result from symmetries of the DCT,
   wherein a 1D descriptor of length $[n(n+1)/2]-1$ is obtained.

16. The non-transitory computer readable program storage device of claim 15, wherein the method further comprises, for each patch:
   computing DCT coefficients for each sub-patch in a neighborhood of a current patch, where the neighborhood is a set of non-overlapping nearest-neighbor patches of the current patch.

17. The non-transitory computer readable program storage device of claim 16, wherein the method further comprises:
   averaging each DCT coefficient of each sub-patch of the current patch over all sub-patches of the current patch.

18. The non-transitory computer readable program storage device of claim 16, wherein, for an image with a Bayer pattern, the sub-patches are single color sub-patches that correspond to a color filter array (CFA) pattern.

19. The non-transitory computer readable program storage device of claim 15, wherein DCT coefficients of an image patch have high or low values that depend on the level of disparity in the image patch.

20. The non-transitory computer readable program storage device of claim 13, wherein the method further comprises reducing a training set size of the classifier using clustering.

* * * * *